UNITED STATES PATENT OFFICE.

CHRISTIAN H. KOCH, OF CHICAGO, ILLINOIS, ASSIGNOR TO THE ANTI-FRICTION COMPOSITION JOURNAL-BEARING COMPANY, OF SAME PLACE.

LINING FOR JOURNAL-BOXES.

SPECIFICATION forming part of Letters Patent No. 416,337, dated December 3, 1889.

Application filed July 13, 1889. Serial No. 317,477. (Specimens.)

*To all whom it may concern:*

Be it known that I, CHRISTIAN H. KOCH, a citizen of the United States, residing at Chicago, in the county of Cook and State of Illinois, have invented a new and useful Composition of Matter to be Used for Lining Journal-Boxes and Axle-Boxes, of which the following is a specification.

My composition consists of the following ingredients combined in about the proportions stated, viz: I take of either paraffine, beeswax, or spermaceti, but preferably paraffine, about thirty pounds, and heat the same to a boiling heat, when I add about fifty pounds of clean-washed fibers of asbestus, about ten pounds of either powdered slate or a fine quality of dried blue clay, but preferably powdered slate, and ten pounds of fine particles or powdered mica, when the whole is thoroughly mixed together until in a plastic state of sufficient consistence to be pressed into the desired journal or axle boxes.

Before applying the aforesaid compound or composition of matter to a journal or axle box the box is slightly heated and the inner or working face of the box is thinly coated (such face being previously corrugated for that purpose) with a cement composed of glue dissolved in acetic acid, (cold process,) when a layer of fiber asbestus is placed thereon and pressed into the cement and corrugations of the box, thereby forming the foundation or "clinch-coat" for receiving and retaining the aforesaid composition, when the composition aforesaid is tamped or pressed in the journal or axle box by means of a warmed or heated instrument or tool until filled slightly above its edges.

I do not limit myself to the exact proportions of the ingredients herein specified, as they may be varied without departing from the advantages of my invention.

Having thus described my invention, what I claim, and desire to secure by Letters Patent, is—

The herein-described composition of matter to be used for lining journal and axle boxes, consisting of paraffine, fibers of asbestus, powdered slate, and mica, in about the proportions specified.

CHRISTIAN H. KOCH.

Witnesses:
N. COWLES,
J. B. HALPENNY.